United States Patent
Hanifen et al.

(10) Patent No.: US 10,798,156 B2
(45) Date of Patent: *Oct. 6, 2020

(54) INTELLIGENT CONTENT DELIVERY NETWORKS

(71) Applicant: Brandfolder, Inc., Denver, CO (US)

(72) Inventors: Jim Hanifen, Denver, CO (US); Logan Sears, Denver, CO (US); Ajaykumar Rajasekharan, Longmont, CO (US); Brett Nekolny, Denver, CO (US); Luke Butterfield Beatty, Denver, CO (US)

(73) Assignee: BRANDFOLDER, INC., Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/806,142

(22) Filed: Mar. 2, 2020

(65) Prior Publication Data

US 2020/0204616 A1    Jun. 25, 2020

Related U.S. Application Data

(63) Continuation of application No. 16/688,420, filed on Nov. 19, 2019, now Pat. No. 10,623,483, which is a continuation of application No. 16/508,660, filed on Jul. 11, 2019, now Pat. No. 10,523,742.

(60) Provisional application No. 62/698,392, filed on Jul. 16, 2018.

(51) Int. Cl.
G06F 16/955    (2019.01)
H04L 29/08    (2006.01)

(52) U.S. Cl.
CPC ........ *H04L 67/1002* (2013.01); *G06F 16/955* (2019.01); *H04L 67/02* (2013.01)

(58) Field of Classification Search
None
See application file for complete search history.

(56) References Cited

U.S. PATENT DOCUMENTS

| 8,898,150 B1 * | 11/2014 | Kuramochi | G06F 16/951 707/722 |
| 8,930,370 B2 * | 1/2015 | Musgrove | G06F 16/951 707/740 |
| 8,954,427 B2 * | 2/2015 | Silber | G06F 16/24575 707/728 |

(Continued)

*Primary Examiner* — Joshua Joo
(74) *Attorney, Agent, or Firm* — Duft & Bornsen, PC

(57) ABSTRACT

Systems and methods are provided for distributing content. One embodiment includes a content management server. The content management server includes a memory that stores a library of assets comprising digital media, and that further stores scores that indicate popularity of the assets in the library. The content management server also includes an interface that receives a Hyper Text Transfer Protocol (HTTP) request that is sourced by a device remote from the content management server, and a controller that identifies a Uniform Resource Locator (URL) within the HTTP request, selects a group of assets for the URL from the library, identifies an asset that has a highest score within the group, and provides the asset in response to the HTTP request. The controller alters scores for assets in the library over time as assets in the library are provided, and selects different groups of assets for the URL over time.

20 Claims, 13 Drawing Sheets

(56) References Cited

U.S. PATENT DOCUMENTS

| | | | |
|---|---|---|---|
| 2002/0129014 A1* | 9/2002 | Kim | G06F 16/951 |
| 2008/0114753 A1* | 5/2008 | Tal-Ezer | G06F 16/951 |
| 2009/0222454 A1* | 9/2009 | Liesche | G06F 16/954 |
| 2010/0262495 A1* | 10/2010 | Dumon | G06Q 30/02 |
| | | | 705/14.54 |
| 2012/0047033 A1* | 2/2012 | Hauser | G06Q 30/0263 |
| | | | 705/14.73 |
| 2014/0222803 A1* | 8/2014 | Bowman | G06Q 40/04 |
| | | | 707/727 |
| 2014/0330686 A1* | 11/2014 | Kulasooriya | G06Q 30/0223 |
| | | | 705/28 |
| 2015/0073922 A1* | 3/2015 | Epperson | G06Q 30/0277 |
| | | | 705/14.73 |
| 2015/0365397 A1* | 12/2015 | Chang | G06F 21/6263 |
| | | | 726/4 |
| 2017/0337201 A1* | 11/2017 | Pak | G06F 16/24578 |
| 2019/0266289 A1* | 8/2019 | Bartholomew | G06F 16/9535 |

* cited by examiner

CONTENT DELIVERY ENVIRONMENT

SMART CDN LINK

HTTP REQUEST

EXPLICIT AND INFERRED PARAMETERS

FIG. 6
ASSET TABLE

600

| ASSET | ASSET SCORE | TAGS | RIGHTS |
|---|---|---|---|
| LOGO_ORIG | 83 | TEXT, ENGLISH, BLUE | 56/10,000 VIEWS REMAIN FOR THIS MONTH |
| LOGO_SMALL | 59 | TEXT, ENGLISH, BLUE, LOW_RES | 45,000/100,000 VIEWS REMAIN FOR THIS YEAR |
| LOGO_LARGE | 42 | TEXT, ENGLISH, BLUE, HIGH_RES | NO VIEWS UNITL NEXT MONTH |
| LOGO_BLACK | 76 | TEXT, ENGLISH, MONOCHROME | NO LIMIT ON VIEWS FOR MOBILE CUSTOMERS |
| LOGO_BEACH | 95 | TEXT, ENGLISH, BLUE, SAND, WATER, BEACH | NO LIMIT ON VIEWS FOR USERS IN COUNTRY: NED |

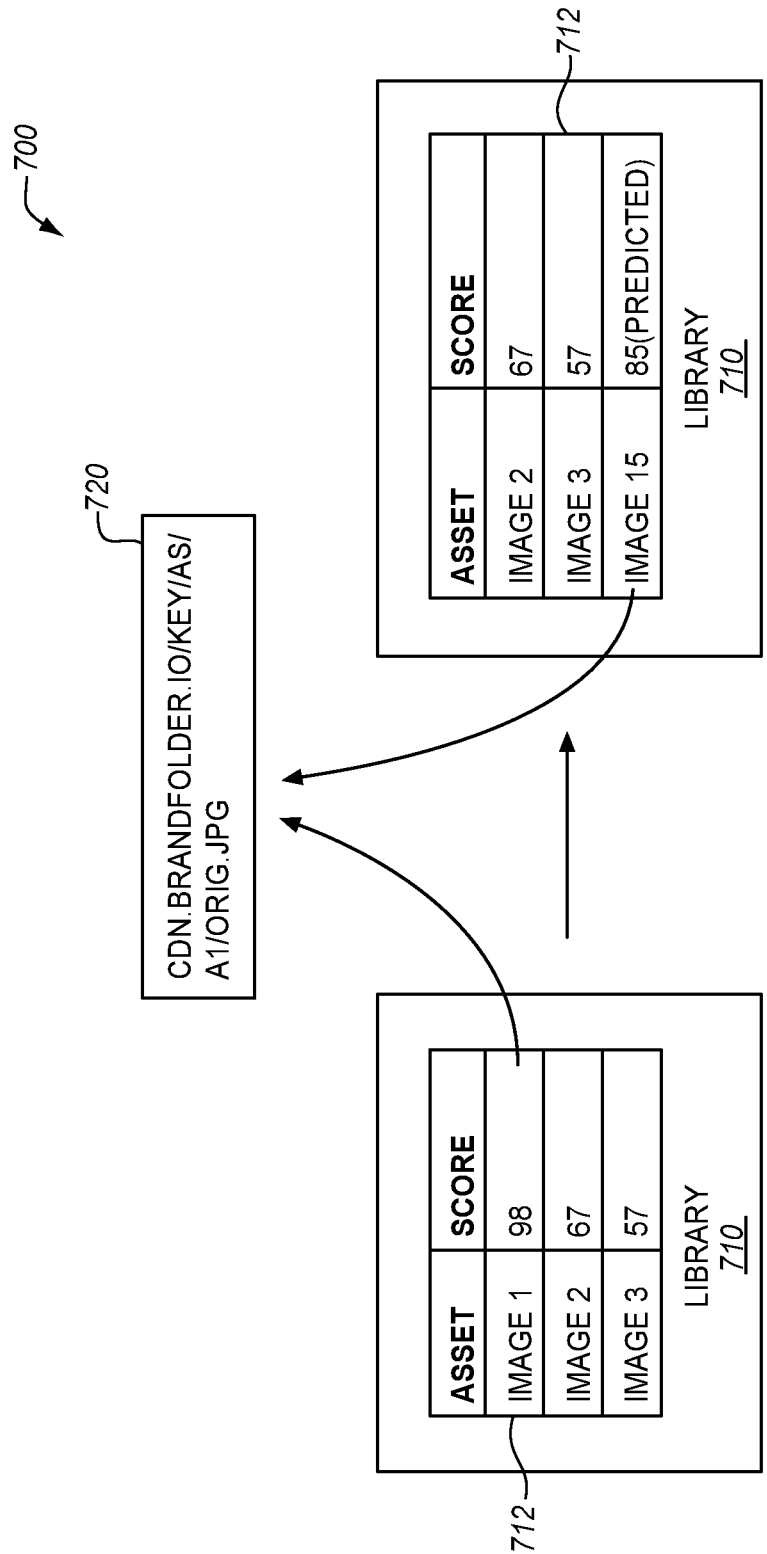

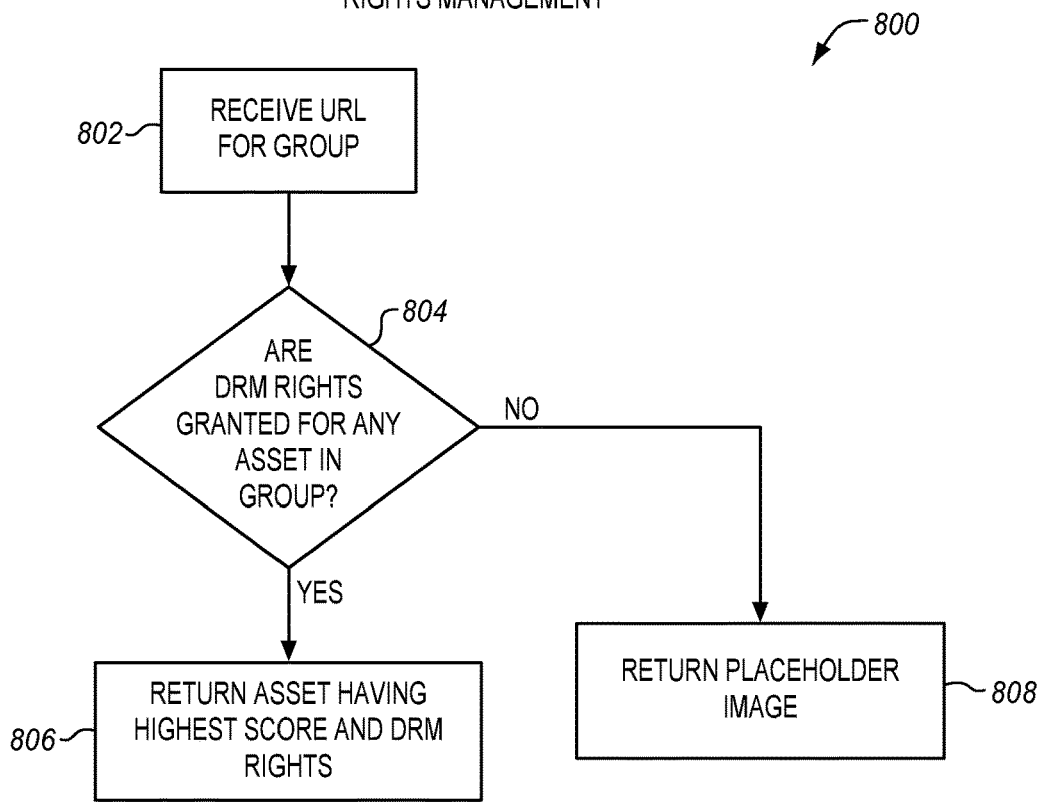

FIG. 8
RIGHTS MANAGEMENT

FIG. 9
ACCESS RIGHTS

| |
|---|
| N VIEWS PER USER |
| N VIEWS PER PERIOD OF TIME |
| VIEWS ENABLED DURING DATE RANGE |
| VIEWS ENABLED AFTER IMPLEMENTATION DATE |
| VEWS ENABLED FOR SPECIFIC WEBSITES/APPS |
| FIRST PARTY USE ONLY |
| FIRST PARTY AND THIRD PARTY USE ONLY |
| VIEWS ENABLED IN SPECIFIED COUNTRIES |
| VIEWS ENABLED FOR SPECIFIC URLS |
| VIEWS ENABLED AFTER LEGAL APPROVAL OF ASSET |
| VIEWS ENABLED AFTER BUSINESS APPROVAL OF ASSET |
| VIEWS ENABLED FOR DEMOGRAPHIC |
| VIEWS ENABLED FOR LANGUAGE |

INFERENTIAL HIERARCHY - CATALOG

INFERENTIAL HIERARCHY – SOCIAL MEDIA

A/B TESTING

PREDICTIVE SCORING AND ASSET GENERATION

INTELLIGENT CONTENT DELIVERY NETWORKS

FIELD

The disclosure relates to the field of digital content, and in particular, to selectively providing, testing, and/or formatting digital content for users.

BACKGROUND

Content Management Systems (CMSs), also referred to as Digital Asset Management (DAM) Systems, deliver assets to users on behalf of websites and/or applications. For example, a CMS may provide images of products for display at a website or app.

A CMS may store digital content such as text, audio, and video files for one or more clients, and this content may relate to one or more brands. Each brand is placed under the control of a brand management team tasked with ensuring that their brand retains a desired reputation in the eye of the public. Even for small clients, a single brand may be associated with thousands, or hundreds of thousands, of assets. Not all assets are suitable in theme, format, size, or content for all websites or apps at which the assets could be presented. Thus, the process of selecting an asset for each website/app is time-consuming, and requires constant coordination with website operators. This coordination must be repeated each time an asset for the brand is altered. The rate at which these labor-intensive coordination operations occur is increasing, because the public increasingly demands fresh content that is relevant to current fads, trends, demographics, and events.

It can also be difficult for a brand management team to determine the efficacy of a particular asset provided via a CMS. For example, if an asset is regularly accessed, this can mean that the asset itself is popular, or it can mean that an underlying product or website associated with the asset is popular. The difficulty of discerning these details has increased over time, because the public desires greater privacy, and may prefer not to be tracked via cookies or other methods.

Hence, those who manage content continue to seek out enhanced systems and methods for addressing these issues.

SUMMARY

Embodiments described herein provide enhanced systems and techniques that enable a CMS to independently select from among multiple assets, in response to Hyper Text Transfer Protocol (HTTP) requests received from remote devices. The HTTP requests include Uniform Resource Locators (URLs) that do not refer to specific files, but rather indicate one or more categories of acceptable content. The CMS then selects an asset from among many acceptable assets that could be used to fulfill the request, formats the asset in accordance with the request, and provisions (e.g., transmits or sends) the asset to the device that generated the request. The CMS further changes the number and/or type of assets associated with each URL dynamically and on an ongoing basis. One embodiment is a system that includes a content management server. The content management server includes a memory that stores a library of assets comprising digital media, and that further stores scores that indicate popularity of the assets in the library. The content management server also includes an interface that receives a Hyper Text Transfer Protocol (HTTP) request that is sourced by a device remote from the content management server, and a controller that identifies a Uniform Resource Locator (URL) within the HTTP request, selects a group of assets for the URL from the library, identifies an asset that has a highest score within the group, and provides the asset in response to the HTTP request. The controller alters scores for the assets in the library over time as the assets in the library are provided, and selects different groups of assets for the URL over time.

A further embodiment is a method that includes storing a library of assets comprising digital media at a content management server, storing scores that indicate popularity of the assets in the library at the content management server, receiving a Hyper Text Transfer Protocol (HTTP) request that is sourced by a device remote from the content management server, identifying a Uniform Resource Locator (URL) within the HTTP request, selecting a group of assets for the URL from the library, identifying an asset that has a highest score within the group, providing the asset in response to the HTTP request, altering scores for the assets in the library over time as the assets in the library are provided, and selecting different groups of assets for the URL over time.

A still further embodiment is a non-transitory computer readable medium embodying programmed instructions which, when executed by a processor, are operable for performing a method. The method includes storing a library of assets comprising digital media at a content management server, storing scores that indicate popularity of the assets in the library at the content management server, receiving a Hyper Text Transfer Protocol (HTTP) request that is sourced by a device remote from the content management server, identifying a Uniform Resource Locator (URL) within the HTTP request, selecting a group of assets for the URL from the library, identifying an asset that has a highest score within the group, providing the asset in response to the HTTP request, altering scores for the assets in the library over time as the assets in the library are provided, and selecting different groups of assets for the URL over time.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 6 is a table depicting a group of assets in an illustrative embodiment.

FIG. 7 illustrates alterations to the contents of a group of assets in an illustrative embodiment.

FIG. 8 is a flowchart depicting a method for handling usage rights for assets in a group in an illustrative embodiment.

FIG. 9 is a table depicting a variety of permissions for assets in an illustrative embodiment.

DESCRIPTION

The figures and the following description depict specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Content Delivery Environment

Figure 1:
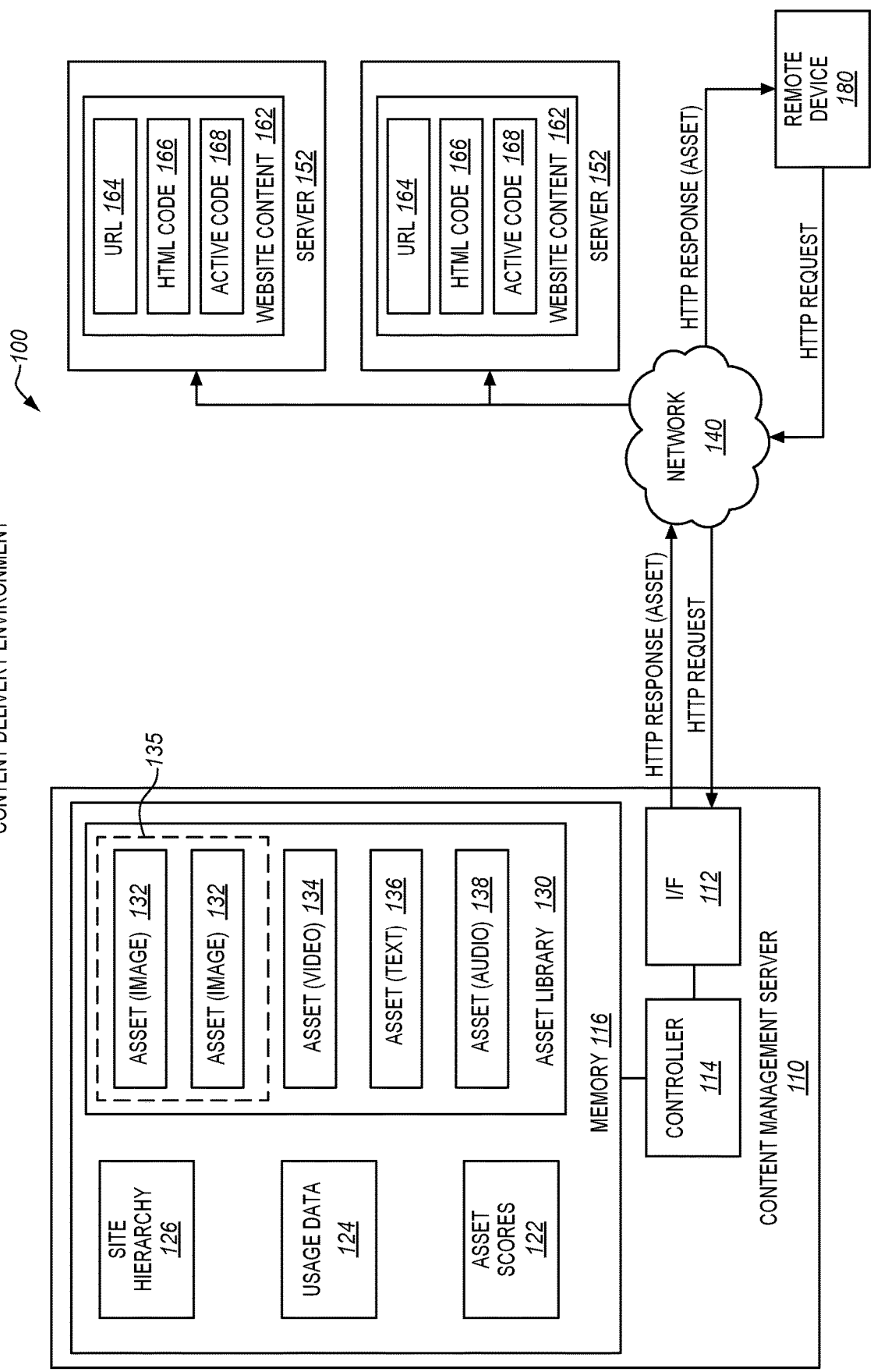
FIG. 1 is a block diagram depicting a content delivery environment in an illustrative embodiment.

FIG. 1 is a block diagram depicting a content delivery environment 100 in an illustrative embodiment. Content delivery environment 100 comprises any system, component, or device that is capable of dynamically providing different assets (e.g., digital media in the form of files or streams) to remote devices over time in response to the same URL. As used herein, an "asset" may comprise a single file or stream of digital media, or may comprise a collection of files or streams having the same content. For example, an asset depicting a ski resort may include multiple files that use different formats, resolutions, or color spaces, which all are different versions of the same parent file (e.g., image), or are all based on the same parent file. Thus, when used herein, the act of "providing an asset" for a multi-file or multi-stream asset refers to providing a relevant file or stream for an asset that has been selected.

In this embodiment, content delivery environment 100 includes content management server 110, which distributes assets to servers 152 and/or remote devices 180 via a network 140 (e.g., the Internet, a mobile network, etc.). As used herein, devices and systems are "remote" from each other when they are separated via a network and their communications pass through the network. In one embodiment, a remote device 180 (e.g., a laptop, tablet, cellular phone, personal computer, etc.) accesses a server 152 in order to retrieve content for a web page or app.

The server 152 hosts its own website (or app) content 162, such as HyperText Markup Language (HTML) code 166, and active code 168 (e.g., Java code, JavaScript code, Perl code, etc.). The server 152 also includes URLs 164 that point to content stored at content management server 110, which is remote from the server 152. For example, the URLs may be found within a "src" tag for an image in the HTML code 166, or may be referenced by active code 168. These URLs direct a remote device 180 to generate HTTP requests for handling by the content management server 110.

As depicted in FIG. 1, the content management server 110 includes interface (I/F) 112, which receives incoming HTTP requests. I/F 112 may comprise any suitable physical interface for receiving data, such as an Ethernet interface, Universal Serial Bus (USB) interface, an interface compliant with Institute of Electrical and Electronics Engineers (IEEE) 802.11 protocols, etc.

The content management server 110 also includes a memory 116 which stores an asset library 130. The asset library 130 includes one or more groups 135 of assets 132 (in the form of images), assets 134 (in the form of videos), assets 136 (in the form of text), and/or assets 138 (in the form of audio) for servicing incoming HTTP requests. While only five assets are illustrated in FIG. 1, any suitable number of assets (e.g., single file or multi-file assets) may be stored in asset library 130.

The assets may comprise branded assets in the form of digital files. Groups 135 may be predefined, or may be defined on the fly by analyzing the assets stored at the content management server 110. For example, a group 135 may include all assets depicting a logo for a specific brand, may include all assets depicting a specific product, etc. In one embodiment, the groups 135 include assets associated with specific tags, products, services, brands, etc.

As used herein, "tags" comprise any properties, content, or thematic similarities which may be shared between assets. Tags may refer to the file properties of an asset (or files within a multi-file asset) (e.g., resolution, file type, etc.) and/or to objects or concepts depicted within (or referenced by) an asset. Thus, a tag of "tree" may be included if there is a depiction of a tree within an image or video asset, or a reference to a tree within text or audio. Similarly, a tag of "French" may be included in reference to text, image, video, or audio assets that include French words. Tags may further refer to file metadata, a length of an audio or text file in time or words, textual content in a text file, an amount of saturation of an image, a primary hue of an image, etc. In one embodiment, tags describe a set of rights/permissions for the asset. For example, some assets may be tagged as being intended for seasonal release, for viewing by specific demographics, or for limited amounts of views.

Based on incoming HTTP requests and/or other information, a controller 114 at the content management server 110 selects assets for providing to remote devices 180. The controller 114 also determines usage data 124 (e.g., metrics indicating how often various assets are provided for consumption in the form of views, shares, clicks, etc.), and assigns asset scores 122 to individual assets based on the usage data 124.

Asset scores 122 may be determined based on a formula that applies weights to various metrics of consumption indicated in the usage data 124, based on a machine learning model (e.g., neural network) that processes the usage data 124. In one embodiment, an asset score comprises a time-weighted combination of metrics for each of multiple types of consumption. For example, each act of consumption of an asset during a look-back period may be assigned a value depending on the type of consumption, and the value contributed to an asset score by an act of consumption may progressively be degraded by a time decay function, based on a length of time ago that the act of consumption occurred.

Data indicating consumption can be aggregated on a periodic basis (e.g., daily) and used to calculate asset scores. As a part of calculating asset scores, a "raw asset score" for each asset may be computed. In one embodiment, the raw asset score is a time weighted combination of counts of each of the different types of consumption as per formula (1) below, wherein $RS_i$ is the raw score for an asset i, $w_k$ are the weights for each type of consumption k, g(t) is a time decay function (e.g., an exponential function, step function, linear function, etc.), and $C_i^k(t)$ is the count of a type of consumption k for asset i on day t:

$$RS_i = \Sigma_t \Sigma_k w_k g(t) C_i^k(t) \qquad (1)$$

Having computed raw asset scores, asset scores may further be normalized within a range (e.g., between zero and one hundred). This may be performed by selecting a group of assets for normalization (e.g., assets within the same brand, a group of similar images, assets that are text, assets that are images, assets that are video, assets across an entire organization, etc.), and identifying an asset within the group having a highest raw asset score. The asset with the highest raw score may be referred to as $\max(RS_1, \ldots, RS_n)$. Normalized asset scores may then be determined within a desired range from zero to a maximum value (e.g., one hundred) from each raw score $RS_i$ according to formula (2) below:

$$S_i = \frac{RS_i}{\max(RS_1, \ldots, RS_n)} \times (\text{Maximum Value}) \qquad (2)$$

The weights $w_k$ assigned to each type of consumption, and the time decay function g(t), may be predefined or may be based on other factors. For example, weights for different types of consumption may be equal by default. In one embodiment, a user chooses weights for each type of consumption. For example, a user may define weights for different types of consumption using natural language descriptors (e.g., "very important," "unimportant," "mildly important," etc.). Each natural language descriptor for a weight may be associated with a different value (e.g., 0.9, 0.1, 0.4, etc.). In a similar fashion, the user may choose a type of decay function g(t) (e.g., none, exponential decay, step, or gradual decay), and controller 114 may then implement a predefined decay function of the selected type. In further embodiments, the user may even specifically define the contents of a decay function.

When a remote device 180 accesses a website or app hosted by the server 152, the remote device 180 loads any relevant HTML code 166 and active code 168 from the server 152. This code includes one or more URLs that point to the content management server 110. The URLs cause the remote device 180 to issue an HTTP request (i.e., including the URLs) to the content management server 110. The content management server 110 then selectively determines which relevant asset to provide to the remote device 180 for each of the URLs.

The content management server 110 described herein provides a technical benefit, because it allows each URL to indicate a general request for a type of content (e.g., pictures of a specific type of product), instead of requiring that URLs be directed to specific files stored on the content management server 110. This means that the server 152 need not be responsible for updating or revising the content over time, even if the content changes with the season. For servers 152 that host websites with a large amount of third-party content (e.g., branded content describing products or services of third parties who do not own or manage the server 152), this reduces workload. This technique also enhances security at the servers 152, by reducing the number of entities that need write permission at the servers 152.

Assets 132-138 within content management server 110 may further be accessed, modified, and/or updated by controller 114 based on input from a user (e.g., a brand manager) that has permission to access content for one or more brands at the content management server 110, or may be automatically updated. For example, assets that have scores below a threshold may be automatically removed from the asset library or flagged for suspension. In this manner, controller 114 manages the operations of content management server 110 in distributing and/or evaluating assets. Controller 114 may be implemented, for example, as custom circuitry, as a hardware processor executing programmed instructions, or some combination thereof.

FIG. 1 also shows that memory 116 includes one or more site hierarchies 126. The site hierarchies 126 in memory 116 indicate inferred hierarchical arrangements of web pages on the servers 152. This data may further inform the process of asset scoring, as described below with regard to FIGS. 12-13.

Illustrative details of the operation of content delivery environment 100 will be discussed with regard to FIG. 2. Assume, for this embodiment, that asset library 130 has been populated with a large number of assets for each of multiple products listed on a website or app hosted by server 152, and that each of the assets is associated with a score.

Content Delivery Methods

Figure 2:
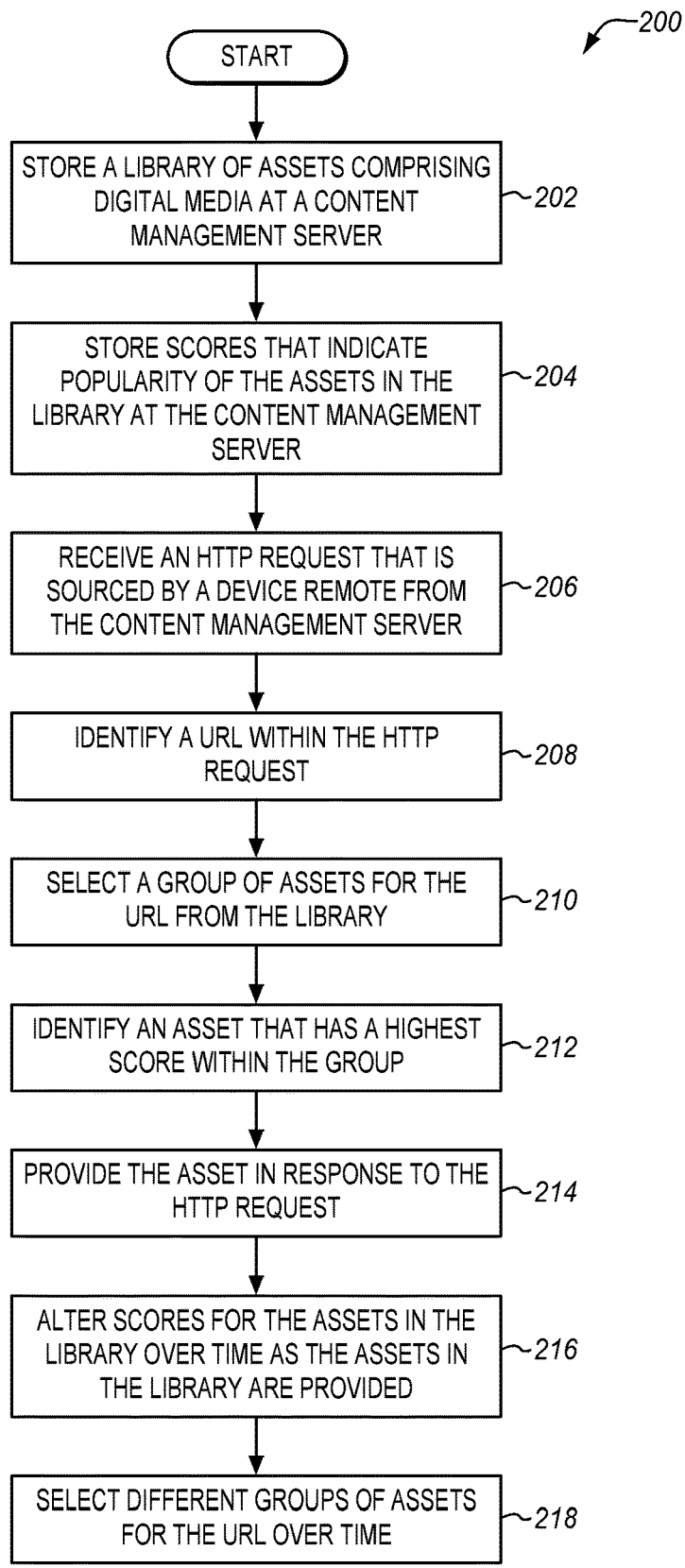
FIG. 2 is a flowchart illustrating a method of operating a content delivery environment to dynamically return varying content over time in response to a single URL in an illustrative embodiment.

FIG. 2 is a flowchart illustrating a method 200 of operating a content delivery environment to dynamically return varying content over time in response to a single URL in an illustrative embodiment. The steps of method 200 are described with reference to content delivery environment 100 of FIG. 1, but those skilled in the art will appreciate that method 200 may be performed in other systems. The steps of the flowcharts described herein are not all inclusive and may include other steps not shown. The steps described herein may also be performed in an alternative order.

According to method 200, step 202 includes controller 114 storing a library of assets comprising digital media at a content management server 110. This may comprise populating asset library 130 with assets, replacing assets within the library, removing old assets, altering assets, and/or performing other operations. For example, during a holiday season, the asset library 130 may be modified by removing (or suspending) generic assets related to specific products or services, and adding (or activating) new seasonal assets that depict the products or services with a holiday theme. Step 202 may also comprise applying tags to assets to indicate associated products, services, or other properties of the assets. The assets will be utilized by remote device 180 to facilitate the generation of content relating to a website or app.

In step 204, controller 114 stores asset scores 122, which each indicate a popularity of a corresponding asset in the asset library 130 at the content management server 110. The asset scores 122 may be regularly updated by controller 114 as assets are distributed to remote devices 180 and/or servers 152. The asset scores 122 may include reported or inferred numbers of clicks, views, shares on social media, and other information, and may be based on these metrics of consumption during specific periods (e.g., periods of one day, week, month or year, or retrospective moving-window periods corresponding with those amounts of time).

At a point in time, a user of remote device 180 accesses a website or app hosted by server 152. Server 152 provides relevant HTML code 166 and active code 168 to the remote device 180, including URLs 164 that point to content management server 110. In one embodiment, each URL refers to a product or service in a general fashion, and there are multiple assets within asset library 130 that are associated with each product or service. To acquire content via the URLs, the remote device 180 generates one or more HTTP requests for acquiring content from the content management server 110. The HTTP requests are sent via the network 140, and each include one or more URLs. For example, the remote device may generate one HTTP request per web page visited, or multiple HTTP requests per web page visited.

In step 206, I/F 112 receives an HTTP request that is sourced by the remote device 180 (which is remote from the content management server 110), and in step 208, controller 114 identifies a URL within the HTTP request. This may comprise parsing the HTTP request to detect the URL.

In step 210, controller 114 selects a group of assets for the URL from the asset library 130. This process involves determining a type of asset indicated by the URL in a general fashion (e.g., assets describing a product or service, assets associated with certain tags such as "outdoor," "electronics," "sunset," etc.), and then including those assets within the group. Because the contents of the asset library 130 (and associated permissions to provide the assets) vary over time, the contents of the group also vary over time, even when controller 114 processes the exact same incoming URL.

In step 212, controller 114 identifies an asset having the highest asset score within the group. This may comprise the asset that has the greatest amount of consumption (e.g., views, shares, clicks, or weighted combination thereof), may comprise the asset with the greatest amount of consumption within a window of time, etc., as described above with regard to calculating asset scores. The identified asset is then selected for providing to the remote device 180 for viewing by the user. In one embodiment, multiple asset scores are associated with each asset, and each of the asset scores indicates a popularity of the asset with a different demographic. The selection process is then performed with reference to asset scores for a demographic indicated in the HTTP request, associated with the website or app, associated with the user of the remote device 180, or determined by other means. In embodiments wherein multi-file assets are included, step 212 further includes selecting a file of the asset based on additional parameters (e.g., whether the user is on a mobile device, etc.), selecting a default file for the asset, or performing other operations.

In step 214, controller 114 provides the identified asset in response to the HTTP request. In one embodiment, controller 114 generates an HTTP response that includes or is accompanied by the selected asset, and I/F 112 transmits the asset (e.g., within the HTTP response or accompanying the HTTP response) via network 140 to the remote device 180. In embodiments where the asset comprises a multi-file or multi-stream asset, this step comprises providing the file or stream selected in step 212.

Steps 206-214 may be repeated multiple times (e.g., thousands of times per day, millions of time per day, or more) by content management server 110 as it provides content to numerous (e.g., millions of) remote devices 180 for a variety of websites (e.g., thousands of websites) hosted by the servers 152.

In step 216, controller 114 alters scores for the assets in the asset library 130 over time, as the assets in the asset library 130 are provided. For example, controller 114 may increase a number of views of an asset, and then increase a score for an asset accordingly in response to servicing an incoming HTTP request for that asset. In a further example, controller 114 may reduce the asset score of an asset over according to a time decay function. This may continue iteratively in a similar manner to steps 206-214 above, or may be performed periodically (e.g., during a lull in traffic, nightly, etc.).

Because asset scores change over time, and because the number and type of assets stored within asset library 130 also dynamically changes over time, the exact group of assets used to service a URL request varies over time, as does the ranking of assets within the group. Thus, in step 218 controller 114 selects different groups of assets for the same URL over time, and furthermore identifies different assets as having the highest score, as the asset scores change over time. This means that content management server 110 dynamically provides different pieces of content in response to the exact same URL over time, enabling content to vary dynamically and automatically in accordance with the wishes of an entity that manages an associated product or service. The specific images (or other assets) provided via a website or app therefore no longer need to be chosen by an operator of that website or an individual on a brand management team. This provides a substantial advantage over prior techniques, which required manual intervention in order for provided content to vary, and were not capable of automatically providing different assets over time in response to the same URL.

With a discussion provided above of the dynamic processing and provisioning performed by the content management server 110, FIGS. 3-7 illustrate further details of URLs, HTTP requests, and assets utilized by a content delivery environment.

Architecture Facilitating Content Delivery

Figure 3:
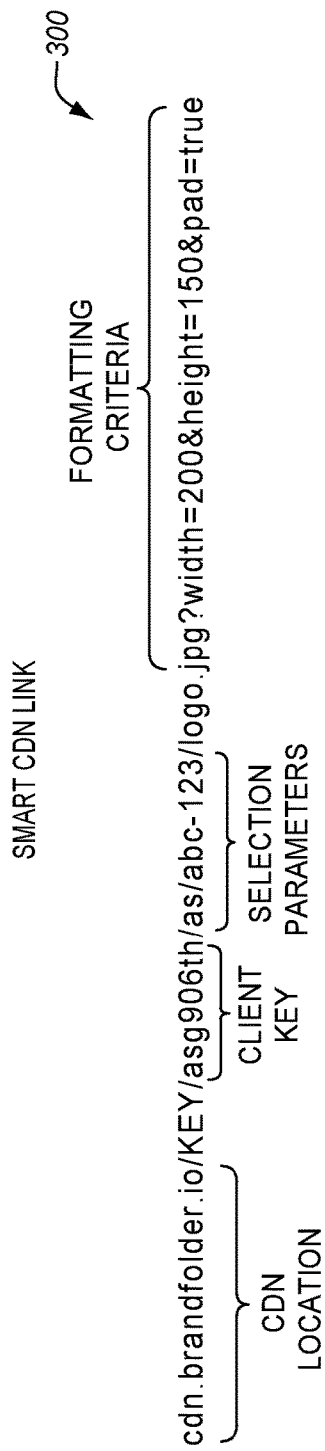
FIG. 3 depicts a customized URL that is processed to dynamically return varying content over time in an illustrative embodiment.

FIG. 3 depicts a customized URL 300 that is processed to dynamically return varying content over time in an illustrative embodiment. According to FIG. 3, the URL 300 includes a reference to a CDN location (e.g., an Internet location for content management server 110), such as an Internet Protocol (IP) address or domain name of the content management server 110. The URL also includes a client key, which indicates a unique identity of the entity operating the server 152, the entity operating the remote device 180, or the entity managing a specific category of assets (e.g., the entity managing assets for a product or service, assets for an entire brand, etc.). In some embodiments, the client key indicates any suitable combination of the above entities. In further embodiments, the client key may comprise an encrypted key that is capable of decryption by the content management server 110. The information provided in the client key enables the controller 114 to determine permissions relating to the assets being requested. In further embodiments, the client key is associated with, or explicitly recites, one or more demographics of the user and/or the web site that the URL 300 is placed on.

The URL 300 also includes selection parameters. The selection parameters may include different codes to indicate different types of processing criteria at the content management server 110. In one embodiment, the selection criteria includes a prefix as well as a search term. Various prefixes may be utilized. Examples of prefixes include "/match/", which is interpreted by the controller 114 as a request to find any matching asset that has the highest score, "/as/" which instructs the controller 114 to select a specific asset (e.g., a file for a specific image, such as a logo) within the asset library 130, and "/at/", which may be utilized to bypass the dynamic selection techniques described herein and to enforce selection of a specific file for a specific asset. The search term may identify a predefined group of assets, or provide a list (or logical combination) of tags or other instructions for assembling an on-the-fly group of assets.

URL 300 further includes formatting criteria, which may indicate a desired file type, file size, dimensions for an asset, and other characteristics. After an asset has been selected, controller 114 may further process the asset by performing scaling, cropping, file conversion, or other operation in order to ensure compliance of the asset with the formatting criteria. In such embodiments, assets may be accompanied by metadata indicating minimum or maximum allowed resolutions, locations that cannot be cropped (e.g., because they depict a product), and/or other information. In embodiments wherein an asset comprises a multi-file or multi-stream asset, the controller 114 uses the formatting criteria to select a file or stream of the asset for providing to the remote device 180.

Figure 4:
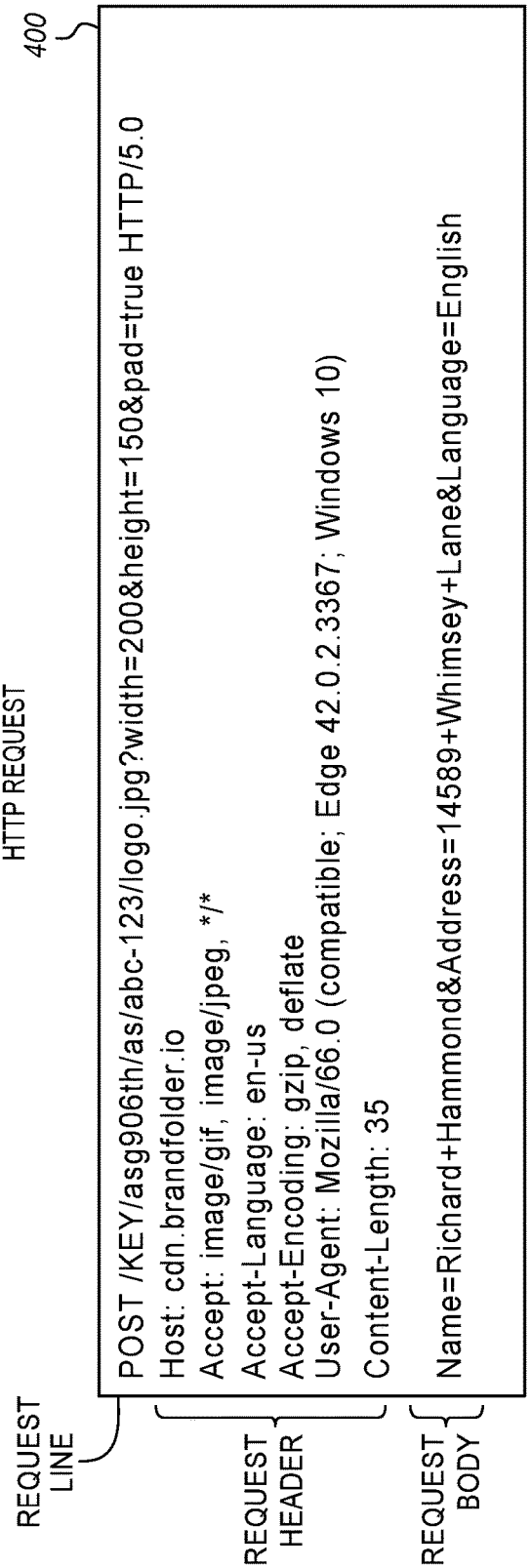
FIG. 4 depicts an HTTP request which includes a customized URL that is processed to dynamically return varying content over time in an illustrative embodiment.

FIG. 4 depicts an HTTP request 400 including a customized URL that is processed to dynamically return varying content over time in an illustrative embodiment. As shown in FIG. 4, HTTP request 400 includes a request line which has a URL, a request header that describes a variety of parameters, and a request body. The HTTP request may also include information indicating a referrer, a location of the user, and/or a user agent for the user.

Figure 5:
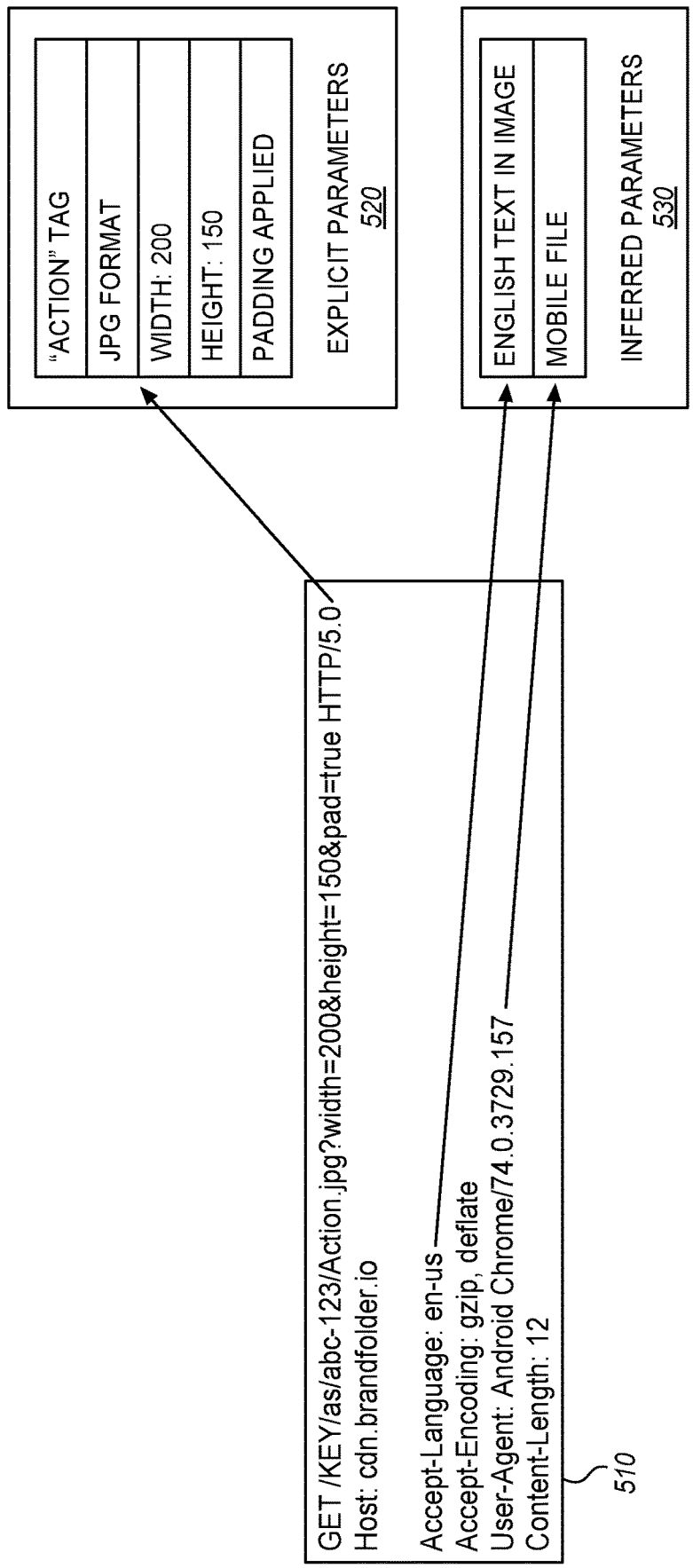
FIG. 5 illustrates parameters pulled from an HTTP request in an illustrative embodiment.

FIG. 5 illustrates parameters pulled from an HTTP request 510 in an illustrative embodiment. In FIG. 5, explicit parameters 520 are used for selecting and/or modifying a group of assets, and these explicit parameters 520 are included within the URL itself. The explicit parameters 520 request images having the "action" tag for the "abc-123" product. The explicit parameters also include formatting criteria that indicate a file format and size of the image, as well as whether to pad the image. However, a controller of a content manager also detects inferred parameters 530. Inferred parameters 530 do not explicitly require or request specific search criteria, but rather are included in the HTTP request and are determined by the controller to result in certain requirements or selection criteria. For example, a controller may infer that because the HTTP request 510 indicates that the user speaks English, images that include rendered English text (or no text) should be supplied. Furthermore, controller 114 may infer that because the remote device 180 is a mobile device (e.g., as indicated by the use of Android Chrome), a mobile file (e.g., a compressed image, a low-resolution image, an image with a reduced amount of colors, etc.) should be selected to accommodate limited bandwidth.

FIG. 6 is a table 600 depicting a group of assets in an illustrative embodiment. In this embodiment, each of the assets is a different version of a logo. Each asset is accompanied by an asset score indicating a popularity of the asset. Each asset is further accompanied by a series of tags, such as tags indicating usage rights or features within the asset.

FIG. 7 illustrates alterations to the contents of a group of assets in an illustrative embodiment. As shown in FIG. 7, a controller of a content management server may serve a first asset ("image 1") within a group 712 of assets within a library 710, in response to a URL 720. The controller may then revise the contents of the group (e.g., based on usage rights) to remove the first asset and include a new asset ("image 15") within the group 712. The new asset, having the highest asset score, is then provided in response to the same URL 720.

Content Delivery Analysis

By processing incoming HTTP requests over time, additional information may be retrieved and compiled. For example, a controller of a content management server may determine which assets are most likely to be served in response to different selection factors, the most popular geographical locations at which each asset is provided, the most popular internet locations at which each asset is provided, as well as asset performance over time and across different demographic groups. If additional information is provided indicating when marketing campaigns (or other external events beyond the control of a content management server) occur, the change in consumption of various assets may be used to indicate how successful such marketing campaigns were. Usage information may even be used to determine an amount of bandwidth utilization for specific files, edge cache hit/miss counts (which may indicate how often the files behind Smart CDN links are changing), and other insights.

Usage Rights

FIG. 8 is a flowchart depicting a method 800 for handling usage rights for assets in a group in an illustrative embodiment. According to method 800, step 802 includes receiving a URL that refers to a group of assets stored at a content management server 110.

In step 804, a controller 114 at the content management server 110 determines whether usage rights are granted for any asset in the group. If so, then all assets without usage rights are filtered out of the group, and a remaining asset in the group having the highest score is provided in step 806. Alternatively, if no assets in the group have usage rights, then in step 808 the controller returns a placeholder image (e.g., an image that states that no assets exist for which rights are granted).

FIG. 9 is a table 900 depicting a variety of permissions for assets in an illustrative embodiment. Table 900 illustrates that permissions (i.e., usage rights) may be limited to a number of views (e.g., per user, per website, and/or per period of time), a range of dates within which views are allowed, an implementation date after which views are allowed, and/or the enabling of views for specific websites or applications. The permissions may also be limited to first party use (i.e., use by a website or app run by the owner of copyright to the asset) or third party use (e.g., specified websites run by authorized resellers of a product or service), may be enabled for specific URLs, countries, demographics, or languages, or may be limited to viewing only after legal or business review of the asset has been completed. In further embodiments, access to each asset is selectively granted based on any suitable logical combination of permissions discussed above. In this manner, a controller of a content management server can identify restricted assets that a device or server does not have permission to access (e.g., by reviewing a received HTTP request), and prevent the restricted assets from being provided.

The systems and methods described herein are also capable of detecting abuses of asset placement that are not in keeping with defined permissions for an asset. For example, if an HTTP referrer in an incoming HTTP request indicates that the link was provided by a blacklisted website, then a controller of a content management server may generate a notification identifying the blacklisted party that is attempting to utilize the asset, and may prevent the asset from being provided. In a similar manner, HTTP referrer information can be used to detect entities which are providing URLs directed to assets that will expire soon, or which are providing URLs to assets that are no longer available.

Inferred Hierarchies of Pages

FIGS. 10-13 discuss website hierarchies, and various operations that may be performed in order to infer the hierarchy of pages at a website. These website hierarchies may be used to detect clicks or adjust asset scores for assets.

Figure 10:
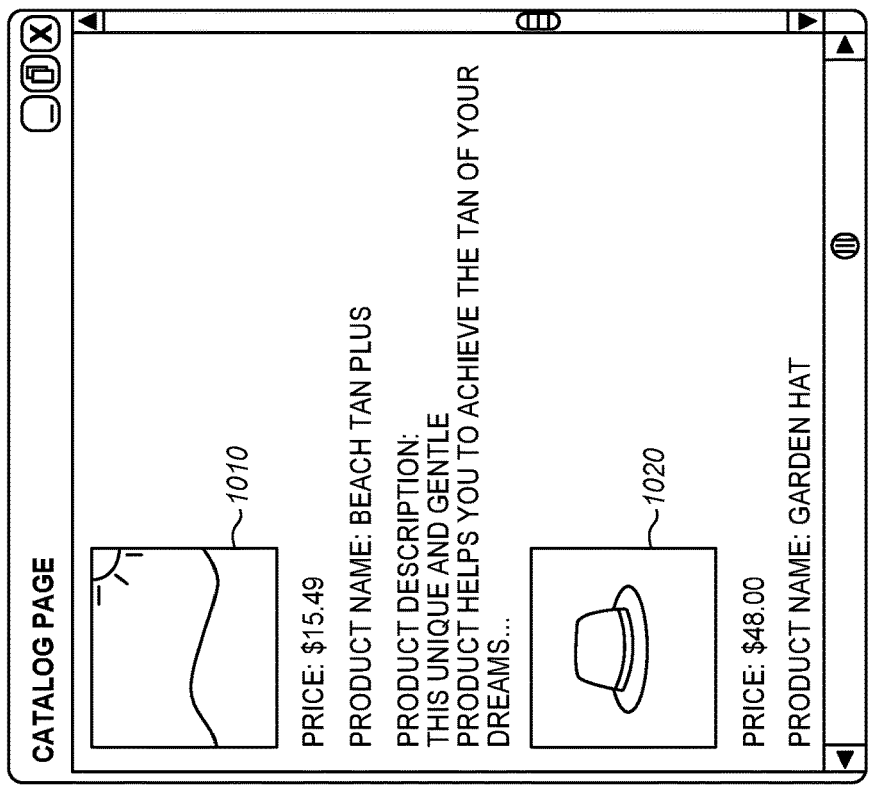
FIG. 10 illustrates a catalog page of a website in an illustrative embodiment.

FIG. 10 illustrates a catalog page 1000 of a website in an illustrative embodiment. The catalog page operates as a landing page for website traffic, and hence receives more traffic than other pages on the website. In this embodiment, the catalog page 1000 includes thumbnail images 1010 and 1020, which are sourced from a content management server, and website content, which is provided by a server that hosts the website. Thus, thumbnail images 1010 and 1020 are referred to by URL when a user loads the catalog page 1000, which causes one or more HTTP requests to be sent from the user's device to the content management server. A browser at the user's device then builds the catalog page using information from both the server that hosts the website, and the content management server.

Figure 11:
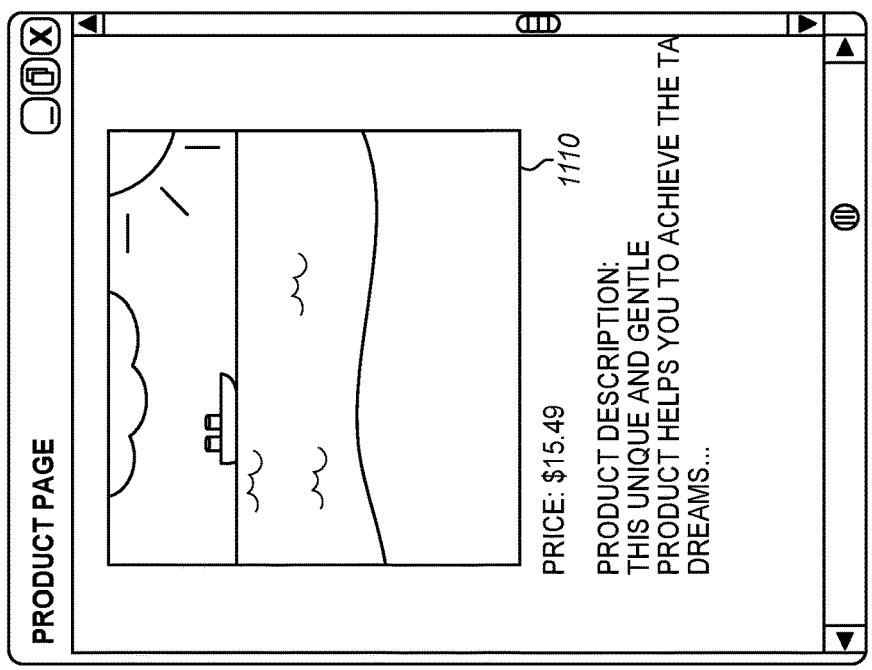
FIG. 11 illustrates a product page of a website in an illustrative embodiment.

FIG. 11 illustrates a product page 1100 of a website in an illustrative embodiment. The product page 1100 may be accessible by clicking on the thumbnail image 1010 of FIG. 10. FIG. 11 includes a high-resolution image 1110 of the thumbnail image 1010. Based on an expected relationship wherein low resolution images lead to high resolution images, a controller of a content management server may infer that a user has clicked on a thumbnail image 1010, by determining that the user has loaded the high-resolution image 1110 (and vice versa). In further embodiments, such an inference is made by a high resolution image being provided within a certain time period of providing a low resolution image, or based on other means. This means that clicks may be inferentially detected by the content management server without any need for cookies.

Figure 12:
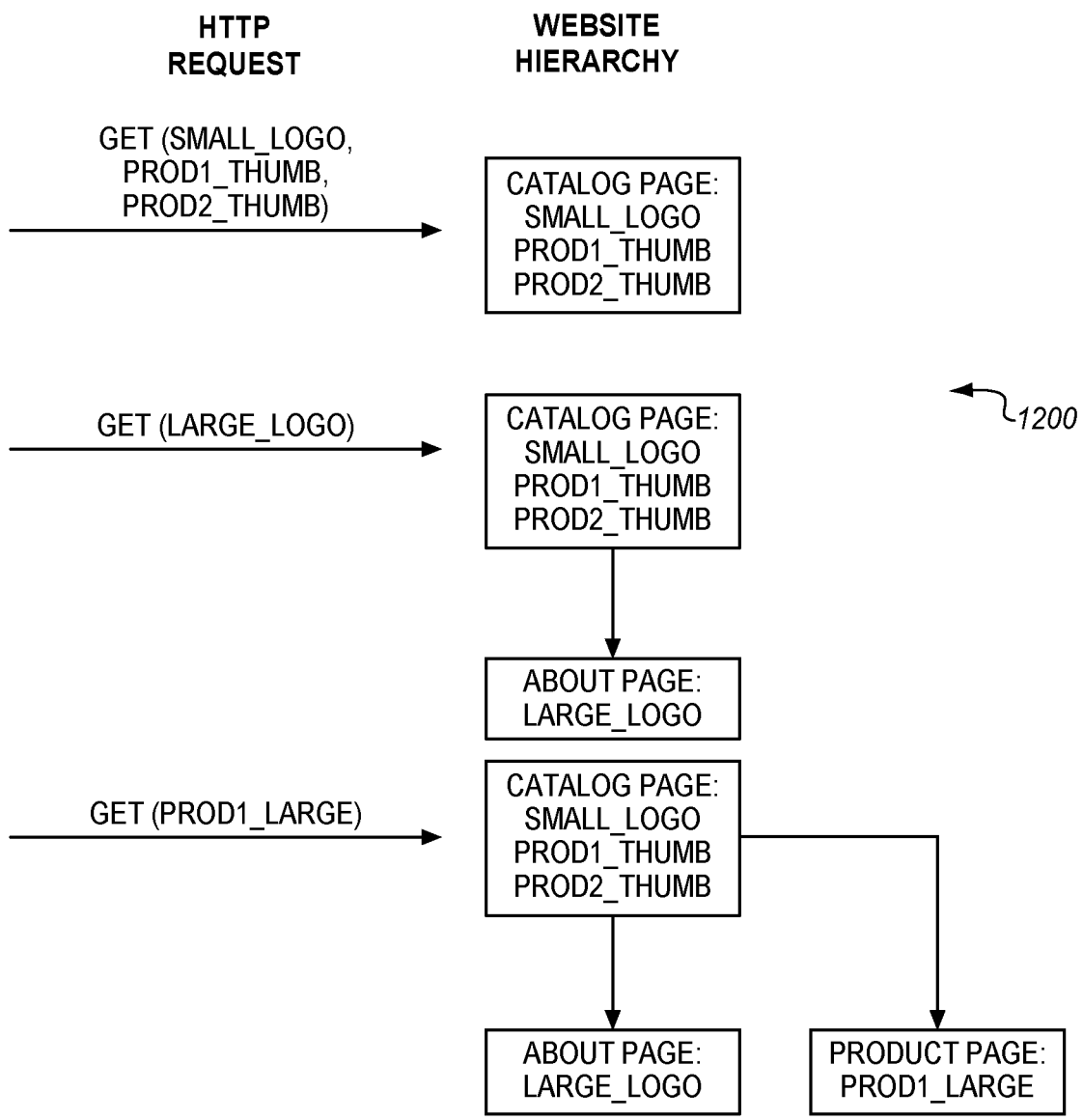
FIGS. 12-13 depict inferred hierarchies within a website in illustrative embodiments.
Figure 13:
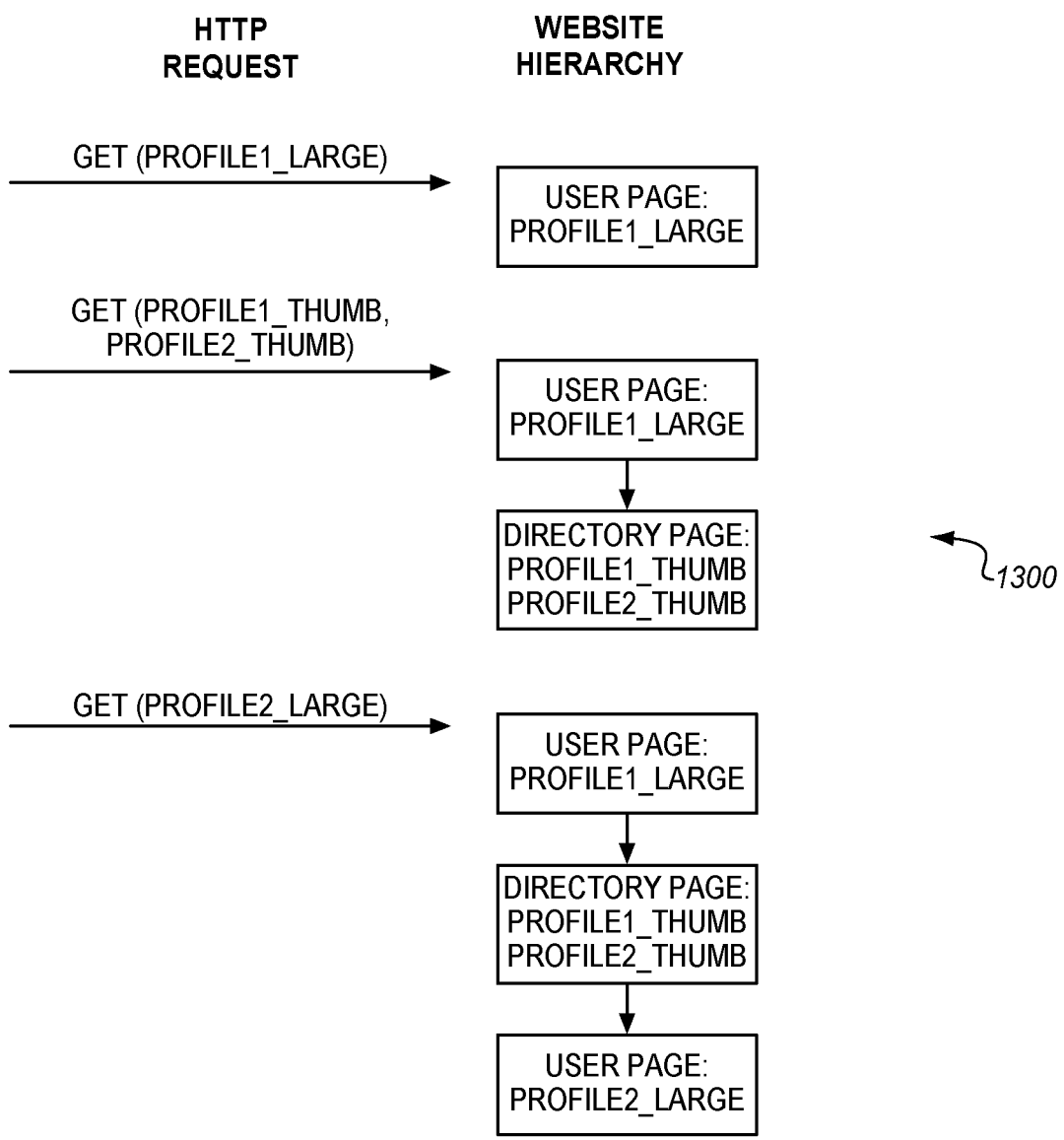

FIGS. 12-13 depict inferred hierarchies within a website in illustrative embodiments. These inferred hierarchies may be determined by a content management server if the content management server is prevented from crawling a website by a robots.txt or other file.

FIG. 12 illustrates a first inferred hierarchy 1200 for a website. Hierarchy 1200 is built up over time as HTTP requests are received. A first HTTP request asks for three separate images (a logo and two products), at low resolutions. The first HTTP request is inferred to be a landing page (e.g., because it is the first page for which assets are requested by the user, or because it includes multiple low resolution images). A next HTTP request requires a large version of the logo that was previously provided. Based on this, the controller infers that the page is an "about" page describing the website or brand that the logo is related to, and that the about page is linked to the catalog page. A third HTTP request is received for a high-resolution image of one of the products. Based on this, the controller infers that the website includes a product page for the product, and that the product page is linked to the catalog page.

In FIG. 13, a different hierarchy 1300 is inferred, based on the content of incoming HTTP requests. In FIG. 13, a first HTTP request is for a high-resolution profile picture. Thus, a controller of a content management server infers that the user is viewing a user page of a social media network. A next HTTP request includes a thumbnail version of the profile picture, and a thumbnail version of another profile picture. Thus, the controller infers that the user is viewing a directory page, and that the directory page is linked to the user page. A third HTTP request is for a high-resolution image of the other profile picture. Thus, the controller infers that the user is viewing another user page that is linked to the directory page.

The techniques of FIGS. 12-13, which infer website hierarchies based upon relationships between smaller and larger versions of images, may be performed in order to determine the arrangement of pages on a website, even when the website includes a robots.txt file or other instruction that prevents the website from being crawled. This information is valuable, because certain types of pages such as directories or catalogs are expected to receive more traffic than others, and hence their assets will be provided more often not due to popularity of the assets, but rather due to the location of the assets on the website. Hence, assets appearing on catalog pages or directories may have their asset scores discounted by a percentage or set amount in order to allow for an accurate comparison with other assets.

A/B Testing

Figure 14:
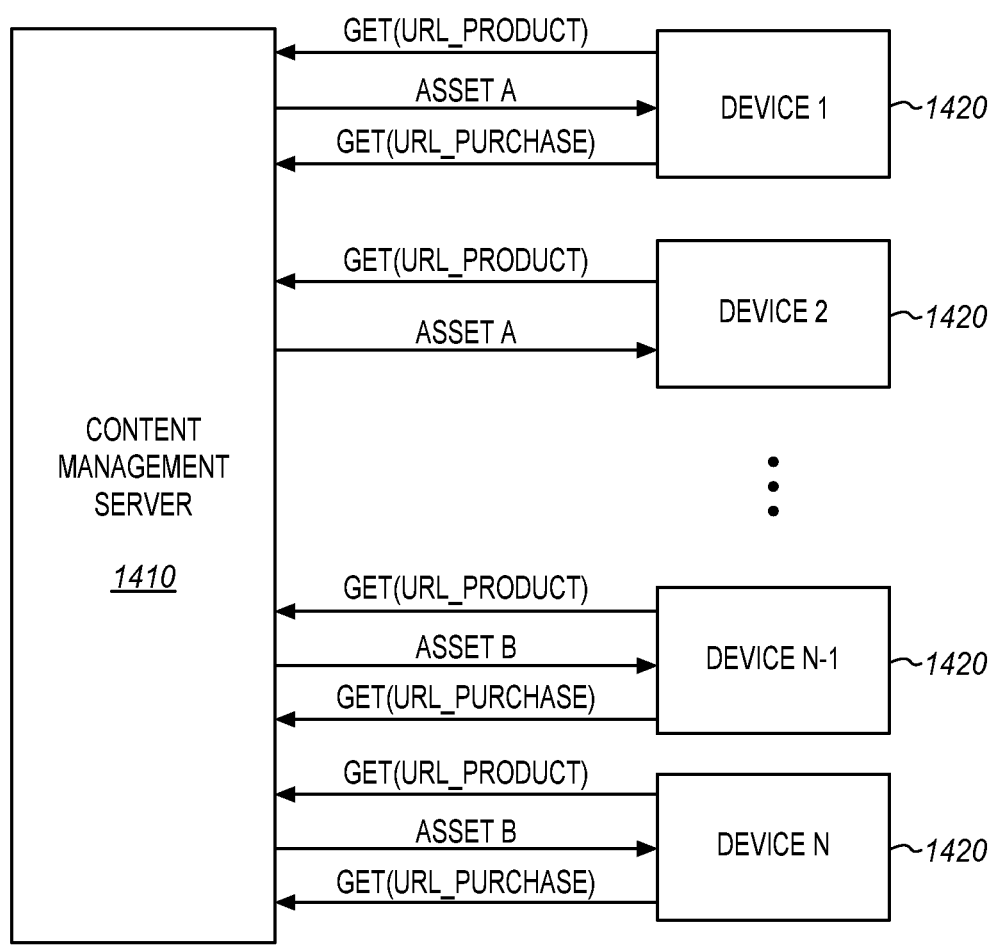
FIG. 14 illustrates an A/B testing environment for comparing assets in an illustrative embodiment.

FIG. 14 illustrates an A/B testing environment for comparing assets in an illustrative embodiment. In FIG. 14, a controller of a content management server 1410 intentionally provides different assets in response to requests from different devices 1420 that recite the same URL, in order to determine which assets are more popular than others. This may be performed without altering the groups that assets belong to, and may even be performed without altering asset scores for the assets.

According to FIG. 14, a content management server 1410 receives a GET HTTP request from device 1 and from device 2 that includes URL referring to a picture for a product, and returns an asset A in response to the HTTP request. The content management server 1410 then waits to determine whether these devices request a larger resolution version of the image, or request assets associated with a checkout page (e.g., "URL_PURCHASE"). If such a request is received, this is considered a "hit" indicating that the asset is popular. Alternatively, if no such request is received within a time period, then this is considered a "miss." In a further embodiment, each hit is provided a value based on an amount of time between the content management server receiving a URL requesting an asset, and receiving a follow-up URL indicating a click on the asset leading to a higher resolution version of the asset or a purchase. By aggregating these statistics over a period of time, a statistical hit rate (or click rate) can be determined for asset A. During the same period that the content management server 1410 provides asset A to device 1 and device 2 in response to the URL, the content management server 1410 provides asset B in response to the same URL from devices N−1 and N. Thus, different users view different versions of the same website, wherein different assets are placed at the website. The controller of the server aggregates statistics for both assets over a period of time (e.g., a week, a month, etc.) to determine which assets are more popular.

In further embodiments, demographic information (e.g., as inferred from IP address, based on language indicated in an HTTP request, etc.) is used to A/B test the same asset with different demographics. A/B testing may also be performed in order to determine whether methods for calculating asset scores are accurate or need to be rebalanced/adjusted.

Predictive Asset Scoring and Generation

Figure 15:
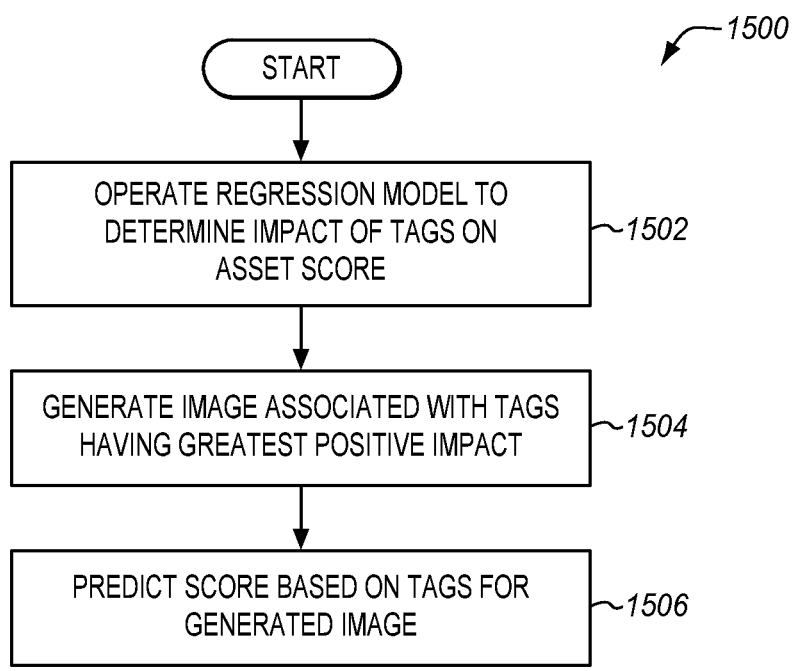
FIG. 15 is a flowchart depicting a method of predicting scores for assets based on a regression model in an illustrative embodiment.

FIG. 15 is a flowchart depicting a method 1500 of predicting scores for assets based on a regression model in an illustrative embodiment. The techniques of method 1500 may be utilized in order to predictively determine the score of an asset prior to the use of the asset in a real-world environment.

In step 1502, a controller of a content management server operates a regression model to determine the impact of tags on asset score. The regression model, in this case a multiple linear regression model, considers current asset scores for assets stored in an asset library, as well as tags associated with each of the assets. This information is used as input to determine coefficients for a weighted formula (e.g., a weighted linear model, having a coefficient for each tag) which each indicate the impact of a tag on the score of an asset. That is, the existing asset scoring information for current assets is used to train the regression model to fit a linear, piecewise, or other formula indicating the amount that each tag contributes to asset score.

With the coefficients determined, the controller generates a new asset for use in servicing incoming HTTP requests in step 1504, or requests the generation of a new asset. The new asset may comprise a picture, text, video, audio, etc. The new asset includes content associated with the tags having the greatest positive impact on asset score (e.g., the top five tags, top three tags, etc.). The new asset may be generated automatically via a machine learning technique, may be a modified version of an existing image, or may be generated manually based on a report from the controller requesting an image having specific tags identified by the regression model.

In step 1506, the controller predicts a score based on the tags associated with the generated image. The score may be predicted by operating the formula that was trained by the regression model. The new asset is then placed into service, and its asset score is set equal to the predicted asset score. The asset score may then change over time as it is provided to users of remote devices.

Method 1500 may be performed iteratively over a period of time to determine how tags are interpreted differently over time by users. Furthermore, method 1500 may be performed for each of multiple demographics in order to determine how different demographics value each different tag, and to generate assets targeted to specific demographics.

EXAMPLES

In the following examples, additional description is provided in the form of a content management environment that dynamically provides varying assets in response to the same URL received in an HTTP request.

In this example, a server 152 hosts a website that includes a catalog of products that are associated with various brands. Each brand is managed by a user of a content management server 110 within a DAM, and pictures and testimonials describing each of the products are stored at the content management server 110. The server 152 hosts a website that includes a catalog page, and also includes a product page for each of the products. The server 152 does not store images or testimonials of the products, but rather refers to these aspects of a product page and/or catalog page via a smart URL.

When a user visits the catalog page, the user's device detects URL references to images in the catalog page, and generates one or more HTTP requests directed to the content management server 110 in order to retrieve the images. Each HTTP request is serviced by the content management server 110, which dynamically provides assets in response to URLs. In this example, when accessing the catalog page, the user's device generates a single HTTP request which is sent to the content management server and includes multiple URLs each referring to a different product picture. For each URL, the content management server 110 reviews the URL to determine a product referred to by the URL, and then selects a group of images depicting the product. The content management server 110 determines which image has both usage rights and the highest asset score, and transmits the image in the group to the user's device. The user's device assembles the catalog page with both content form the server 152 and content from the content management server 110.

The user then clicks on one of the products to view more about the product. This leads the user to a product page. Code for the product page stored on the server 152 includes a URL that references the product, but this URL requires a high resolution, full color image of the product being actively used. The user's device generates an HTTP request using the URL, and the controller for the content management server selects a different group of images associated with tags for high resolution, full color, and active use. The controller then chooses an image of the product that has the highest asset score, and transmits the image for processing. The product page also includes a URL to product testimonials, is included in the HTTP request generated by the user's device to load the product page. The HTTP request also includes metadata such as a preferred language of the user. The controller of the content management server 110 selects and returns textual content associated with the highest asset score in the user's language.

Over time, certain assets within the group are revised, replaced, removed, and added, and the asset scores of the assets also vary (e.g., by degrading over time). This means that as the content management server continues to serve content to users for the website, the actual assets provided in response to the same URL vary over time, as part of a server-side intelligent selection process.

Any of the various computing and/or control elements shown in the figures or described herein may be implemented as hardware, as a processor implementing software or firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Figure 16:
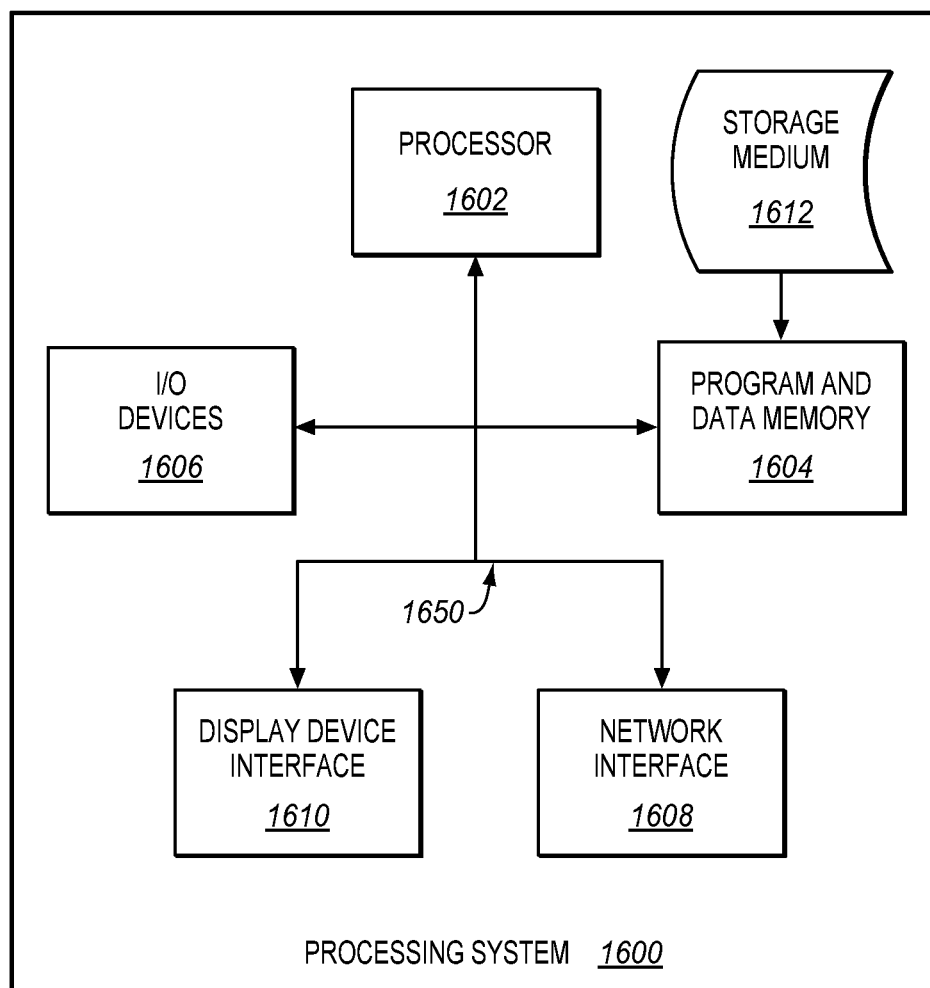
FIG. 16 depicts an illustrative computing system operable to execute programmed instructions embodied on a computer readable medium.

In one particular embodiment, instructions stored on a computer readable medium direct a computing system of content management server 110, to perform the various operations disclosed herein. FIG. 16 depicts an illustrative computing system 1600 operable to execute a computer readable medium embodying programmed instructions. Computing system 1600 is operable to perform the above operations by executing programmed instructions tangibly embodied on computer readable storage medium 1612. In this regard, embodiments may utilize instructions (e.g., code) accessible via computer-readable medium 1612 for use by computing system 1600 or any other instruction execution system. For the purposes of this description, computer readable medium 1612 comprises any physical media that is capable of storing a program for use by computing system 1600. For example, computer-readable medium 1612 may be an electronic, magnetic, optical, electromagnetic, infrared, semiconductor device, or other non-transitory medium. Examples of computer-readable medium 1612 include a solid state memory, a magnetic tape, a removable computer diskette, a random access memory (RAM), a read-only memory (ROM), a rigid magnetic disk, and an optical disk. Current examples of optical disks include Compact Disk-Read Only Memory (CD-ROM), Compact Disk-Read/Write (CD-R/W), Digital Video Disc (DVD), and Blu-Ray Disc.

Computing system 1600, which stores and/or executes the instructions, includes at least one processor 1602 coupled to program and data memory 1604 through a system bus 1650. Program and data memory 1604 include local memory employed during actual execution of the program code, bulk storage, and/or cache memories that provide temporary storage of at least some program code and/or data in order to reduce the number of times the code and/or data are retrieved from bulk storage (e.g., a spinning disk hard drive) during execution.

Input/output or I/O devices 1606 (including but not limited to keyboards, displays, touchscreens, microphones, pointing devices, etc.) may be coupled either directly or through intervening I/O controllers. Network adapter interfaces 1608 may also be integrated with the system to enable computing system 1600 to become coupled to other computing systems or storage devices through intervening private or public networks. Network adapter interfaces 1608 may be implemented as modems, cable modems, Small Computer System Interface (SCSI) devices, Fibre Channel devices, Ethernet cards, wireless adapters, etc. Display device interface 1610 may be integrated with the system to interface to one or more display devices, such as screens for presentation of data generated by processor 1602.

What is claimed is:

1. A system comprising:
    a content management server comprising:
        a memory that stores a library of assets comprising digital media, and that further stores scores that indicate popularity of the assets in the library;
        an interface that receives a Hyper Text Transfer Protocol (HTTP) request that is sourced by a device remote from the content management server; and
        a controller that selects a group of assets from the library based on the HTTP request, identifies an asset that has a highest score within the group, and provides the identified asset in response to the HTTP request,
        wherein the controller adjusts the scores based upon locations of the assets appearing on web pages of a website.

2. The system of claim 1 wherein:
    the controller determines the locations of the assets at the website based on an order in which HTTP requests are received.

3. The system of claim 1 wherein:
    the controller determines the locations of the assets at the website based on Uniform Resource Locators (URLs) in HTTP requests.

4. The system of claim 1 wherein:
    the controller identifies restricted assets in the group that the device does not have permission to access, based on the HTTP request, and prevents the restricted assets from being provided to the device.

5. The system of claim 1 wherein:
    the controller removes assets from the library and adds assets to the library over time.

6. The system of claim 1 wherein:
    the controller determines, based on an additional HTTP request, that a larger version of the identified asset is being accessed by the device, infers that a user of the device has clicked on the identified asset as presented within a web page, and increases a score for the identified asset.

7. The system of claim 1 wherein:
    the scores are based on metrics of consumption of the assets in the library during a period of time.

8. A method comprising:
    storing a library of assets comprising digital media at a content management server;
    storing scores that indicate popularity of the assets in the library at the content management server;
    receiving a Hyper Text Transfer Protocol (HTTP) request that is sourced by a device remote from the content management server;
    selecting a group of assets from the library based on the HTTP request;
    identifying an asset that has a highest score within the group;
    providing the identified asset in response to the HTTP request; and
    adjusting the scores based upon locations of the assets appearing on web pages of a website.

9. The method of claim 8 further comprising:
    determining the locations of the assets at the website based on an order in which HTTP requests are received.

10. The method of claim 8 further comprising:
    determining the locations of the assets at the website based on Uniform Resource Locators (URLs) in HTTP requests.

11. The method of claim 8 further comprising:
    identifying restricted assets in the group that the device does not have permission to access, based on the HTTP request; and
    preventing the restricted assets from being provided to the device.

12. The method of claim 8 further comprising:
    removing assets from the library and adding assets to the library over time.

13. The method of claim 8 further comprising:
    determining, based on an additional HTTP request, that a larger version of the identified asset is being accessed by the device;
    inferring that a user of the device has clicked on the identified asset as presented within a web page; and
    increasing a score for the identified asset.

14. The method of claim 8 wherein:
    the scores are based on metrics of consumption of the assets in the library during a period of time.

15. A non-transitory computer readable medium embodying programmed instructions which, when executed by a processor, are operable for performing a method comprising:
    storing a library of assets comprising digital media at a content management server;
    storing scores that indicate popularity of the assets in the library at the content management server;
    receiving a Hyper Text Transfer Protocol (HTTP) request that is sourced by a device remote from the content management server;

selecting a group of assets from the library based on the HTTP request;

identifying an asset that has a highest score within the group;

providing the identified asset in response to the HTTP request; and adjusting the scores based upon locations of the assets appearing on web pages of a website.

16. The medium of claim 15 wherein the method further comprises:

determining the locations of the assets at the website based on an order in which HTTP requests are received.

17. The medium of claim 15 wherein the method further comprises:

determining the locations of the assets at the website based on Uniform Resource Locators (URLs) in HTTP requests.

18. The medium of claim 15 wherein the method further comprises:

identifying restricted assets in the group that the device does not have permission to access, based on the HTTP request; and preventing the restricted assets from being provided to the device.

19. The medium of claim 15 wherein the method further comprises:

removing assets from the library and adding assets to the library over time.

20. The medium of claim 15 wherein the method further comprises:

determining, based on an additional HTTP request, that a larger version of the identified asset is being accessed by the device;

inferring that a user of the device has clicked on the identified asset as presented within a web page; and increasing a score for the identified asset.

* * * * *